Jan. 8, 1935.  W. H. NAYLOR  1,987,125
SEED AND PLANT PROTECTOR
Filed May 29, 1934
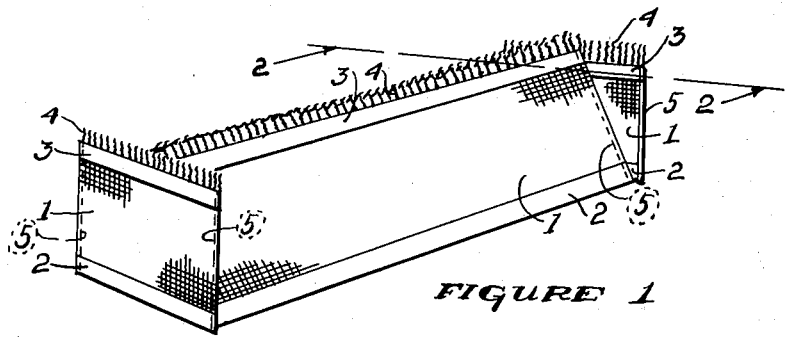
FIGURE 1
FIGURE 2
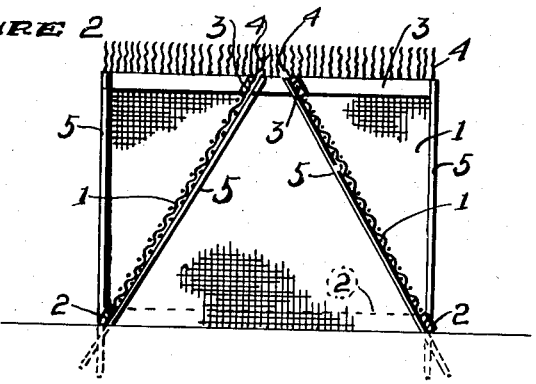

Patented Jan. 8, 1935

1,987,125

UNITED STATES PATENT OFFICE 1,987,125

SEED AND PLANT PROTECTOR

Walter H. Naylor, San Jose, Calif.

Application May 29, 1934, Serial No. 728,104

1 Claim. (Cl. 47—31)

It is the principal object of the present invention to provide means for protecting freshly planted seeds and tender young plants from the ravages of snails, slugs, cut-worms, birds etc.

It is another object of the invention to provide means of the character indicated that will be economical to manufacture, that may be compactly packed for shipment or storage, that may be quickly and easily assembled to form a protecting enclosure of any desired size, and that will be strong, durable, and highly efficient in its practical application.

Figure 1 is a perspective illustration showing several of the devices embodying my invention assembled for the protection of a row of seeds or young plants. Figure 2 is a sectional view on line 2—2 of Figure 1.

Referring now more particularly to the drawing, I show at 1 a piece of wire screen cut to a suitable size and having two metal bands as 2 and 3 mounted thereon in parallel relation to each other. In the present case the band 2 is flush with what may be termed the bottom of the device, and the band 3 is spaced back a distance from the top of the device as shown. These strips or bands may be secured to the screen in any suitable manner and for the purpose of the disclosure may be considered as being soldered thereto.

The top of the device is finished by removing several of the wires parallelling the band 3, thereby leaving an edge composed entirely of upstanding wire ends as 4.

By constructing the device in the manner described it is sufficiently rigid so that it may be assembled with other similar devices and placed over a young plant and the bottom band 2 pressed a little way into the soil. Being so placed the device forms a perfect protection against the onslaught of cut-worms, slugs and other crawlers, because while they may successfully negotiate the sides of the device even up to the edge 4, this upstanding barrier of wire ends effectually prevents their entering the enclosure from the top thereof. Since the devices may be assembled so that no passage can be effected between them, and no passage can be effected under the bottom band, it follows that the young plan is perfectly shielded from marauding crawlers.

Any suitable means may be employed for holding the device in a desired position, but as herein disclosed a rod as 5 is mounted upon each end of the device, each rod extending beyond the lower band 2 so that it may be thrust into the soil.

It is to be understood, of course that while I have herein shown and described certain specific embodiments of the invention, changes in form, construction, and method of assembly and application may be made within the scope of the appended claim.

I claim:

A protector for plants and the like comprising, a wire screen element having stiffening elements associated therewith and extending in parallel relation to one set of wires forming the screen, one stiffening element forming the bottom edge and engageable with the soil and another stiffening element being spaced from the top edge, said screen having the wires parallel with the top stiffening element and above the same removed.

WALTER H. NAYLOR.